United States Patent Office.

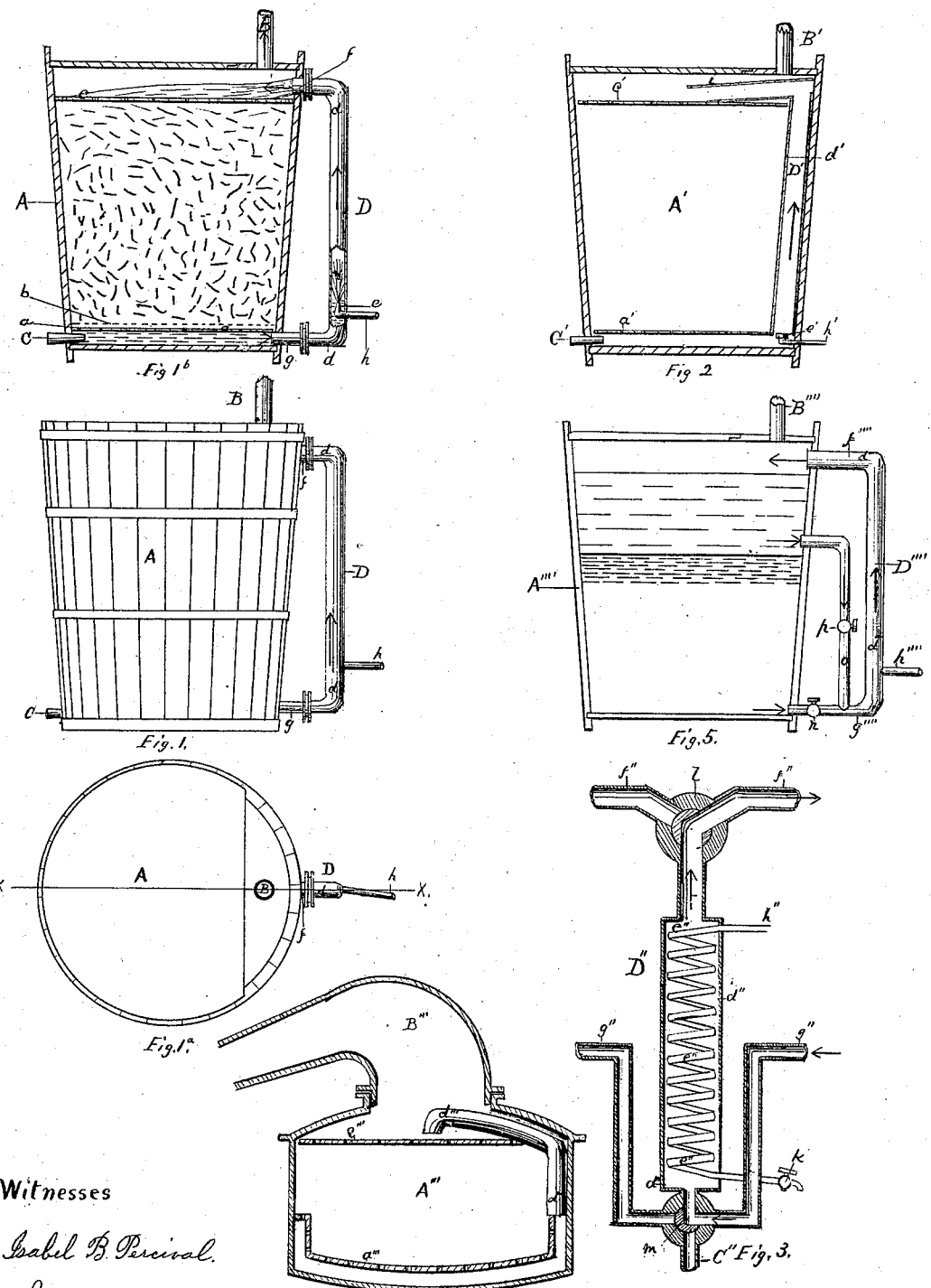

GEORGE GILMAN PERCIVAL, OF WATERVILLE, MAINE, ASSIGNOR TO ISABEL B. PERCIVAL, OF SAME PLACE.

Letters Patent No. 110,998, dated January 17, 1871.

IMPROVEMENT IN APPARATUS FOR EXTRACTING ESSENTIAL OILS.

The Schedule referred to in these Letters Patent and making part of the same.

I, GEORGE GILMAN PERCIVAL, of Waterville, in the county of Kennebec and State of Maine, have invented certain Improvements in "Stills for Extracting and Refining Essential Oils," of which the following is a specification.

Nature and Objects of the Invention.

My invention relates to the combination of a device I call the "heater," with the body of a still, for extracting essential oils from solids or from liquids in such a manner that, when used to extract the oil from a solid, (such as herbs, &c.,) the water (or other liquid) used to extract the oil shall percolate through the herb, &c., then be boiled or exposed to the action of steam, and the steam having passed off to the cooler, carrying with it the vapor of the oil, the remainder of the water shall be discharged upon the herb to repercolate it and be reboiled or resteamed again.

When used to extract volatile oil from a liquid, the parts are so arranged that regulated quantities of this liquid and water shall be drawn into the heater, there commingled and boiled together, and then be discharged into the still.

In the still, after the steam has passed off to the cooler, these two liquids separate, owing to their difference in specific gravity, and regulated quantities of each are again commingled and boiled together.

The object of the invention is to increase the percentage of the oil in the distillate, by percolating and repercolating the solid with boiling water in the still, or by thoroughly commingling the liquid and water when boiled, and, moreover, in certain cases, to diminish the first cost of the still.

Description of the Accompanying Drawing.

Figure 1 is a side elevation of a still for extracting essential oils from solids embodying my invention.

Figure 1ª is a plan of same.

Figure 1ᵇ is a vertical section of same through line x x.

Figure 2 is a vertical section of modification of heater, and of mode of combining it with still.

Figure 3 is a vertical section of another modification of heater.

Figure 4 is a vertical section of a common copper still embodying my invention.

Figure 5 is a vertical section of modification adapted to distilling oils from liquids.

General Description

Fig. 1, A represents a tank of any convenient size, e. g., in shape of an inverted frustum of a cone, six feet high, five feet in diameter at top, and four feet at bottom, made of sound, well-seasoned two-inch hemlock or pine plank, and properly hooped. The bottom is fastened permanently in place.

The top is in two parts, one of which, being about one-seventh of the diameter, is fastened permanently in place, and has connected permanently with it a three-inch pipe, preferably of copper, B, leading to cooler, not shown in drawing.

This pipe B has around its lower mouth a cap of gauze or perforated sheet-copper to keep leaves out.

The other part of the head is removable, and can be rendered tight by packing with oakum or linseed-meal luting.

The tank A is provided with a false bottom, a, fitting loosely, and supported around edges about three inches from bottom of tank. It is pierced with many half-inch holes.

On this false bottom a is laid a disk, b, of copper or brass-wire cloth, or of very coarse strong cotton-cloth.

On this is placed the charge of leaves, &c., and on the charge is placed a false top, c, pierced with many half-inch holes. It should be horizontal.

a and c may be of half-inch boards.

The tank A is provided with a plug, C, for drawing off charge, and may have, if desired, a pressure-gauge and siphon-tube, for filling with water after head is fastened on.

D represents what I call the heater. It is the device in which the water is boiled, and from which it is discharged on top of the leaves after being boiled. By leaves I here mean the charge in the still, whether it consists of leaves, powdered roots, or barks, or any similar solid from which the oil is being extracted.

It consists, in this case, of a copper tube, d, say three inches in diameter, containing a conical steam-jet e.

d is bent twice at right-angles, and is provided with a flange at each end. The centers of the ends are about four feet six inches from each other.

The tube d is joined by its upper flange to a three-inch or four-inch pipe, f, fastened permanently inside of tank A, above false top c, and by its lower flange to a tube, g, two and one-half inches to three inches in diameter, fastened permanently into side of tank A below false bottom a.

The steam-jet e is connected by a pipe, h, with a steam-boiler or other source of steam at a pressure of say from ten pounds to square inch upward.

h has a cock to regulate supply of steam, and should be flexible or jointed, so that the heater D can be used with more than one tank.

The size of the steam-jet e depends upon the usual pressure in the boiler, and should be just large enough to determine a rapid current of boiling water and steam in direction of arrow. Any similar device for boiling the water in tube d and driving it through d may be adopted, such, for example, as are used in steam bilge-ejectors.

To use, put in charge say seven hundred pounds of teaberry leaves, press down firmly and put weights on false top *c*, add water enough to fill to say one-half of height of leaves, fasten on head and let on steam. The water in heater D is heated and carried mechanically up and discharged on false top *c*, its place being supplied by water which percolates through leaves and enters heater D through tube *g*. The whole of the water in tank A soon becomes heated, and when it reaches the boiling point steam and water are both discharged through tube *f* from heater D.

The steam, impregnated with the vapor of the oil, passes through tube B to cooler, and the boiling water percolates down through the leaves, extracting their oil, which is more soluble in hot than in cold water; enters heater D and is boiled again, giving off the oil it acquired in its descent; is again discharged on leaves and again percolates, and so on till all oil is exhausted.

The plug C is then withdrawn, the liquor suffered to escape, and the heater D disconnected from tank A at its flanges, and connected with the tubes *f* and *g* of another similar tank, and used with this second tank while the first is being cooled and recharged.

By this arrangement all parts of the charge are exposed to the action of boiling water, which is necessary with some herbs, *e. g.*, teaberry leaves, and moreover, before being boiled or subjected to the action of steam, the water percolates through the whole of the herb, and after having been boiled it repercolates through again before being boiled again.

Percolation with boiling liquids is considered the most effective way of extracting the active principles of plants; and I call my invention the "percolating still."

In those forms of stills with which I am familiar, some portions of the water may be boiled over and over again without percolating the whole of the herb. The amount of steam to be used depends upon size and nature of charge, pressure in boiler, &c. Regulate so as to obtain the greatest percentage of oil. We may have a cock in tube *g*, if desired, or means of varying the orifices of jet *e*, if desired, and expense is no objection.

Modifications.

A variety of forms may be given to the heater D, and it may be combined with the still in a variety of ways, but in all these modifications the water, when boiled or steamed, is carried by the steam to the top of the charge, and must repercolate the charge before being boiled again.

In fig. 2, the heater D' is placed in the tank A', and has a rose jet, *e'*, instead of a conical jet, *e*, as in fig. 1.

The tube *d'* in this case may be made of half-inch boards, say three inches or four inches square inside, and with a board, *i*, at top, to deflect water and prevent it entering pipe B'. This is a very cheap and quire an effective arrangement.

Fig. 3 is another modification of heater. The water is boiled by contact with a coil of one-inch lead-pipe, *e''*, connected by pipe *h''* with a boiler supplying steam at a pressure exceeding nine pounds to square inch.

*k* is a cock to permit escape of condensed steam from pipe or coil *e''*.

*d''* is a sheet-copper case surrounding coil *e''*, say ten inches in diameter, and connected at top with a three-way cock, *l*, and at bottom with a four-way cock, *m*.

The two tubes *f'' f''* permanently connect cock *l* with the tops, and the two tubes *g'' g''* connect the cock *m* with bottoms of two tanks similar to A, fig. 1, one tank being on each side.

C'' is a waste-pipe, used to draw off liquor from either tank by properly turning handle to cock *m*.

The cocks *l* and *m* are arranged in drawing so as to permit the right-hand tank being used while the left-hand one may be cooling. The cock *l* should be large, to permit free passage of steam and water.

Steam can be conveyed from heater D'' to cooler, as well as from tank A'', if desired, by tube not shown in drawing.

We can use the heater in an intermittent instead of a continuous manner, if desired, by connecting lower part of case *d''* with tubes *f'' f''* by an additional tube, viz: Let water into heater D'', close cock *m*, and when boiled sufficiently close cock *l*, and the water will be forced along this connecting-tube *via* pipe *f''* to tank A'', then open both cocks and refill heater, and so on.

Where we have no supply of steam, instead of heater D'', as in fig. 3, we may use a small cheap boiler, preferably of sheet-copper and tubular, set in a stove or brickwork, holding, say, twenty to thirty gallons, and exposing, say ten square feet to fire.

The whole of the boiler should be placed below low-water level in tank, and need have no pump for filling, nor try-cocks. It should have a cock in its lowest part for emptying, and may be connected with tanks on either side, as in figs. 1 or 3.

Whenever there is water in either tank the boiler will be full, and the tank may be emptied by cock in bottom of boiler. The pipes connecting it with tank should be large, and suitable precautions taken to prevent their being choked.

This is a very cheap and a very efficient substitute for a large and expensive copper still. Other similar means of heating and boiling the water may be adopted, such, for example, as are employed in kitchen ranges.

Fig. 4 is a common copper still embodying my invention.

A''' is the body of the still.
B''', the head.
*a'''*, the false bottom.
*c'''*, the false top.

The bottom and lower part of the sides serve to boil the water, and thus answer the purpose of steam-coil *e''*, in fig. 3.

The tube *d'''* corresponds to *d''* in same figure, and serves to direct the course of the current of steam and boiling water to the top of the charge.

The heating-surface and the tube *d'''* together, correspond to D'', fig. 3, and in this case constitute the heater.

In use, the water is boiled by contact with the heated bottom and sides, and the steam and boiling water together ascend tube *d'''*, and are discharged on false top *c'''*. The steam passes to cooler, and the water percolates through charge before being boiled again.

I claim for this combination, viz., tube *d'''* with still *f'''*, an increased percentage of oil in distillate over the same still used without the tube *d'''*, which is the only difference between this form and the stills in common use.

I am aware of a combination of kitchen and wash-boilers with the tube *d''*, substantially as in fig. 4; but I am not aware that this tube *d'''* or its equivalent has ever been applied to stills for essential oils. In the common still without the tube *d'''*, some portions of the water may accidentally be carried up by the steam, and be discharged on the top of the charge and percolate through, but this is not the case with the bulk of the water. In using the common still it is considered necessary to cover the herb with water, but where tube *d'''* is used less water is necessary, hence greater percentage of oil.

Fig. 5 is a modification adapted to distilling oils from liquids.

The tank A'''' and heater D'''' are similar to corresponding parts in fig. 1, except that there is no false top nor bottom; but the tube $g''''$, connecting lower part of heater $D''''$ with tank $A''''$, has a stop-cock, $n$, and also a branch-tube, $o$, connecting with tank $A''''$, just above its middle. This tube $o$ has a stop-cock, $p$.

To use, put the liquid containing the oil, e. g., melted turpentine, or oil to be refined or redistilled, and water, into the tank in such proportions that the surface of the heavier liquid will be below the upper cock, $p$, and the surface of the lighter liquid above same cock. Let on steam and open cocks $n$ and $p$ to such a degree as will give best results.

The liquid and the water pass into the heater $D''''$ in quantities regulated by stop-cocks, and are there thoroughly commingled and boiled together by the jet of steam, and then discharged into the tank $A''''$, from whence steam passes to cooler more richly impregnated with oil than if the steam had been discharged into bottom of tank. The liquids separate owing to difference in specific gravity, and the process is repeated. In the still for liquids the heater may discharge its contents into bottom of still instead of top. By using a false bottom and top, and closing cock $p$, the still may be used to extract oil from solids.

I do not claim as my invention any of the above-described forms of heaters in themselves, nor any form of tank in itself, nor the combination of a heater with a tank, unless the combination is so constructed as to be used as a still for essential oils.

I claim as my invention—

The combination of the heater D, or its equivalent, with a still for extracting essential oils from solids or liquids, substantially as and for the purpose hereinbefore described.

GEORGE GILMAN PERCIVAL.

Witnesses:
    ISABEL B. PERCIVAL,
    SUSAN J. PERCIVAL.